United States Patent [19]

Bienvenu

[11] 4,385,352

[45] May 24, 1983

[54] ADDRESSING OF OPERANDS WITHIN A SEGMENT UTILIZING SEGMENT DESCRIPTORS

[75] Inventor: Jacques M. J. Bienvenu, Paris, France

[73] Assignee: Compagnie Internationale pour l'Informatique CII-Honeywell Bull (Societe Anonyme), Paris, France

[21] Appl. No.: 253,879

[22] Filed: Apr. 13, 1981

Related U.S. Application Data

[63] Continuation of Ser. No. 968,626, Dec. 12, 1978, abandoned, which is a continuation of Ser. No. 470,496, May 16, 1974, abandoned.

[30] Foreign Application Priority Data

May 16, 1973 [FR] France .................... 73.17765

[51] Int. Cl.³ .................... G06F 9/32; G06F 9/36
[52] U.S. Cl. .................... 364/200
[58] Field of Search .................... 364/200 MS File

[56] References Cited

U.S. PATENT DOCUMENTS

| | | | |
|---|---|---|---|
| 3,504,349 | 3/1970 | Wallis | 364/200 |
| 3,787,813 | 1/1974 | Cole et al. | 364/200 |
| 3,938,096 | 2/1976 | Brown et al. | 364/200 |
| 4,024,508 | 5/1977 | Bachman et al. | 364/200 |
| 4,025,901 | 5/1977 | Bachman et al. | 364/200 |

OTHER PUBLICATIONS

Microprogramming, Principles and Practices, Husson, 1970, Prentice-Hall, Inc., Englewood Cliffs, N.J., pp. 1-21.

*Primary Examiner*—Harvey E. Springborn
*Attorney, Agent, or Firm*—Kerkam, Stowell, Kondracki & Clarke

[57] ABSTRACT

A data processing system includes apparatus for addressing operands within a segment utilizing segment descriptors. The apparatus is responsive to instruction words executed by a first of a plurality of processes. An exemplary embodiment includes a first component which stores a segment table containing a plurality of segment descriptors, a plurality of second components, each selectively coupled to the first components and responsive to a selected one of the instruction words, identify the segment table and the location within the segment table and store an offset address within the segment identified by the segment descriptor, a third component is responsive to an address syllable element of an instruction being executed for addressing one of the plurality of second components, a fourth component stores a displacement D from the address syllable, a fifth component is coupled to the second and fourth components for adding the displacement D to the offset whereby an SRA is developed (a segment relative address), a sixth component stores an index for addressing the next sequential word following the currently addressed word and adds the index to the displacement D and to the offset, a seventh component generates an absolute address of an operand contained within the segment and is coupled to the first and fifth components for adding the segment relative address SRA to the base address of the segment descriptor associated with the segment, and an eighth component is coupled to the sixth component for incrementing the absolute address location of the operand to the next word following the currently addressed word.

29 Claims, 23 Drawing Figures

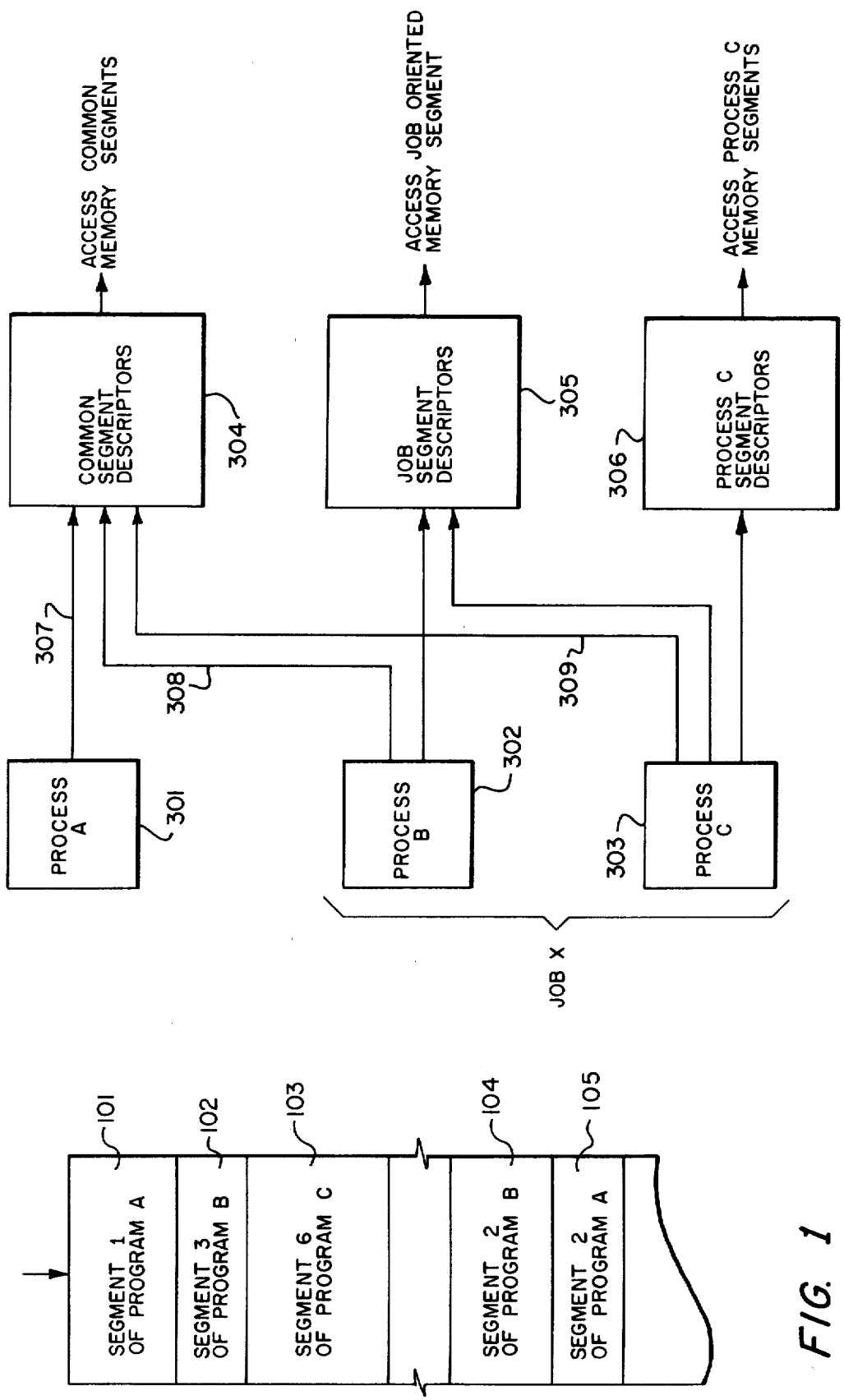

ITB CASE

ITS CASE

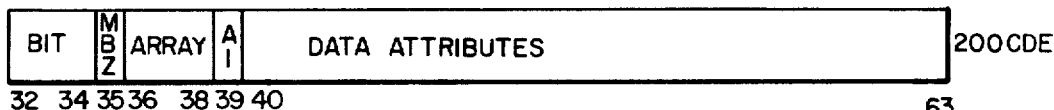
FIG. 2CDE
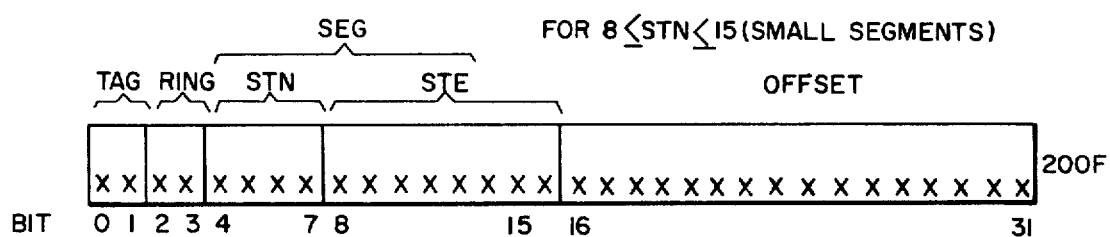
FIG. 2F
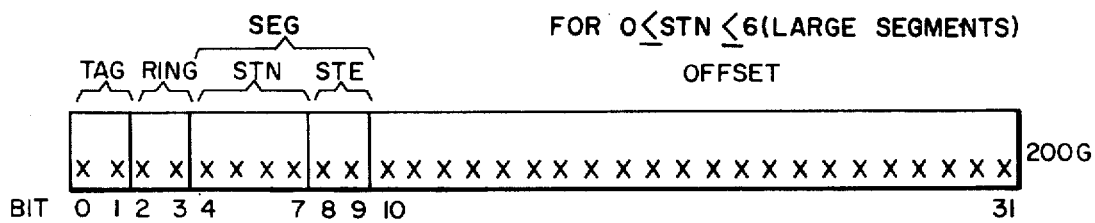
FIG. 2G
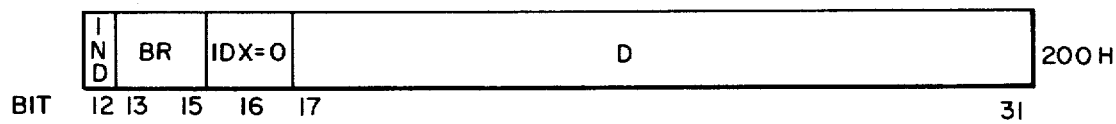
FIG. 2H
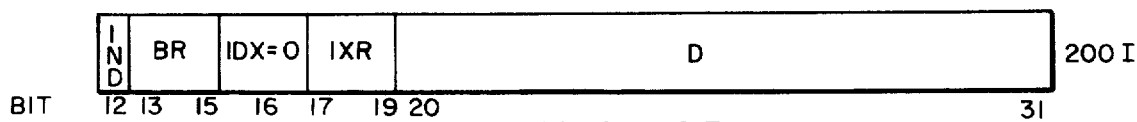
FIG. 2I

ADDRESSING OF OPERANDS WITHIN A SEGMENT UTILIZING SEGMENT DESCRIPTORS

CROSS-REFERENCE TO RELATED APPLICATIONS

This is a continuation of copending application Ser. No. 968,626, filed Dec. 12, 1978, and now abandoned, which in turn was a continuation of then-copending application Ser. No. 470,496, filed May 16, 1974, and now abandoned. Priority is claimed under 35 USC §119 for the benefit of French Application No. 73 17765, filed in France on May 16, 1973.

The following applications, now U.S. Patents, are noted as being related to the present application:

1. Ser. No. 295,301, filed Oct. 5, 1972, by John L. CURLEY, Thomas J. DONAHUE, Wallace A. MARTLAND and Benjamin S. FRANKLIN, and now U.S. Pat. No. 3,820,078 entitled "Multi-Level Storage System Having a Buffer Store with Variable Mapping Modes";

2. Ser. No. 295,303, filed Oct. 5, 1972, by John L. CURLEY and Wallace A. MARTLAND, and now U.S. Pat. No. 3,800,292, entitled "Variable Masking for Segmented Memory";

3. Ser. No. 295,418, filed Oct. 5, 1972, by Thomas J. DONAHUE, and now U.S. Pat. No. 3,820,081 entitled "Override Hardware for Main Store Sequencer";

4. Ser. No. 295,331, filed Oct. 5, 1972, by John L. CURLEY, Thomas J. DONAHUE, Benjamin S. FRANKLIN, Wallace A. MARTLAND and Louis V. CORNARO, and now U.S. Pat. No. 3,821,709 entitled "Memory Storage Sequencer";

5. Ser. No. 295,417, filed Oct. 5, 1972, by John L. CURLEY, Benjamin S. FRANKLIN, Wallace A. MARTLAND, Thomas J. DONAHUE and Louis V. CORNARO, and now U.S. Pat. No. 3,796,996 entitled "Main Memory Reconfiguration";

6. Ser. No. 424,239, filed Dec. 12, 1973, by Pravinsinh L. PARMAR, Richard P. WILDER, Ming H. HOUIE and Benjamin S. FRANKLIN, and now U.S. Pat. No. 3,916,385, entitled "Ring Checking Hardware"; and 7. Ser. No. 425,356, filed Dec. 17, 1973, by James L. BROWN, Richard P. WILDER and Richard P. KELLY, and now U.S. Pat. No. 3,938,096 entitled "Apparatus for Developing an Address of a Segment within Main Memory and an Absolute Address of an Operand within the Segment."

BACKGROUND OF THE INVENTION

1. Field of the Invention

This invention relates generally to data processing systems and more particularly to address development hardware and techniques.

2. Description of the Prior Art

In the early days of computers an intimate knowledge of the structure and operating characteristics of the computer were essential in order to utilise it effectively and solve problems. The primary application of computers then was mathematical computation, with minimal utilization by business and government. Programs were written in the language of the computer for esoteric applications and were generally of interest to the person generating the program or his organization. Moreover the programmer was generally the only person who could anticipate how the computer would react when his program was in the machine; hence his presence at the computer console was required during running of his program in order to correct for unexpected occurrences. During those early days standardization and documentation of programs was practically non-existent.

As the capabilities of the computer became recognized and more particularly with improvements in computer speeds and input/output equipment, and with the advent of high level languages such as FORTRAN and COBOL which permitted the writing of programs symbolically the range of computer applications was extended. Standardized programs under control of an operating system (control program) took over functions previously reserved by necessity for the programmer, and the concept of a single program on which a single processor computed for long periods of time without access to the outside world gave way to batch processing. The batch operating system permitted the grouping of a number of jobs for the purpose of compiling or assembling the source decks into object decks (i.e. translating the user program from symbolic language to machine language), loading and executing the user's programs. Since second generation computers were much faster than their earlier counterparts, the amount of "set up" time required to prepare a computer program for execution in a computer was disproportionately large in comparison to the actual execution time of the program. The batch operating system helped solve this problem. Moreover the batch operating system introduced the concept of a supervisor state and user or problem state for computer operation.

With the reduction of computer set-up time to a negligible percentage of computer run-time for a given job, computers became more attractive for data processing uses other than pure mathematical calculation uses.

However, with the increased usage of computer by business and government organizations there came an increased demand for greater efficiency and operating systems that provided all the services and control to permit jobs to be scheduled and executed in a multiprogramming environment; the third generation computer rose to meet the challenge.

In simple batched systems the important resource of random access memory (generally core memory, but more recently MOS-metal oxide semiconductor memory) was allocated to a single program, and proved to be wasteful of core memory whenever the program did not need the entire memory. One of the first problems of a multiprogramming scheme was the efficient utilization of main memory particularly when several system functions invoked the same procedure. As a first step core memory as partitioned which permitted multiple programs to reside in separate areas of core memory at the same time. However, since programs are rarely of the same size, overlapping of areas with concomitant overlay of one program by another was always a threat. To alleviate this situation nonoverlapping areas of the address space were allocated to each program. This technique partially solved the above problem of overlap but introduced the problem of fragmentation of core memory i.e. "holes" or unused portions of core memory which were too small for any other allocation and hence wasted that portion of core. A solution to the problem of fragmentation of core memory was to provide a relocation register to translate contiguous addresses in name space into contiguous addresses into memory space. This resulted in giving the system freedom in the assignment of physical memory locations and permitted in relocation of name space so as to condense the unused portions of physical main memory into one continuous part of core. Still there remained much inefficiency in the use of main memory because this constant reallocation of main memory was wasteful, and crested severe penalties in supervision overhead particularly where many concurrent programs were continually changing their demands on main memory. The next step in the evolution of efficient memory utilization was the introduction of the concept of paging. Paging is a method of memory allocation wherein the name-space of program is subdivided into equal portions or pages, and physical main memory is subdivided into equal portions or blocks and wherein the page size is equal to the block size although the total name space need not be equal to the physical main memory. A block index is utilized to associate any particular block with any particular page, hence it is not necessary to relocate or move a page with each program demand. One free block is as good as another in which to assign a page since continuity in a program is obtained via the block index, and the probability is high that a free block can be found for a new page in main memory. Some computer systems that utilize paging are the Atlas Computer of Manchester University, XDS940, and Honeywell Information Systems HIS 645.

Although the paging technique solved the problem of allocating main memory space among several programs, it did not solve the problem of allocating addresses in name space among several programs nor the problem of protection of information in main memory. A. W. Holt first suggested the concept of segmentation (Program Organization and Record Keeping for Dynamic Storage Allocation, Information Processing 62, North-Holland Publishing Co., Amsterdam, 1962, p. 539.) and J. B. Dennis further developed the concept of segmentation in order to solve problems pertaining to the naming and referencing of information (Segmentation of the Design of Multiprogrammed Computer Systems, Journal of the Association for Computing Machinery, Vol. 12, No. 4, October 1965, pp. 589-602). Early uses of the segmentation concept were in the Burroughs B5000 computer, and also in the Honeywell Information Systems HIS 645 utilizing the Multics operating system.

In the segmentation scheme a segment is defined as an ordered set of words which are referenced by a segment name that distinguishes the segments from all other segments, and by an integer address that is utilized to select a particular member from the ordered set of uses in the segment. The segment is the unit of user sharing, carries a symbolic name, has a set of associated access attributes which describes, among other things, the function in which each user is permitted to reference the contained procedures and/or data. The segment is permitted to grow and shrink and is directly addressable in programs. The segment is thought of as an extention of the motion of file found in traditional systems; however, the file is not directly addressable nor can files copied into core be directly shared by programs of other users.

The segmentation concept is a reasonable solution to the problem of naming, addressing, allocating and protecting information in main memory such that:

"(1) A computation should have the use of a name space sufficiently large that all information it references may be assigned unique names, and such that reallocation of information within its name space is never necessary.

"(2) Data objects of a computation should be expandable without requiring a reallocation of name space.

"(3) Information referenced in common by several computations should have the same name for all computations that reference it.

"(4) A protection mechanism should operate in name space to permit access to information by a computation only in an authorized manner." (Jack B. Dennis, Segmentation and the Design of Multiprogrammed Computer Systems, Journal of the Association of Computing Machinery, Vol. 12, No. 4, October 1965, pp. 589-602).

Whereas some computer systems referenced supra utilize some of the concepts of paging, blocking and segmentation to improve efficiency of memory utilization, the use of these techniques have not been fully exploited being implemented generally in systems software with some minimum of hardware. For example the HIS 645, utilizing some of the concepts of paging and segmentation, is an upgraded HIS 635 which was modified to include multiple memory modules, multiple input/output controllers, multiprocessors, and a series of special registers called attachment registers. Together with a virtual memory concept and the MULTICS software package the HIS 645 computer incorporates some of the concept supra.

As the fourth generation system begins to take shape it will undoubtedly exhibit the best characteristics of the third generation computer system, such as paging and segmentation. What is needed, however, is an improved version of segmentation with improved segmented addressing techniques and segmented addressing hardware.

OBJECTS

It is an object, therefore, of the instant invention to provide improved segmented addressing hardware.

It is another object of the invention to provide an improved computer addressing method and hardware wherein the segment serves as the unit of addressability.

It is still a further object of the invention to provide computer addressing hardware wherein the levels of direct access is provided at the level of segments private to a process.

Another object of the invention is to provide computer addressing hardware wherein the level of direct access is provided at a level of the segments shared among processes of a process group.

Yet another object of the instant invention is to provide computer addressing hardware wherein the level of direct access is at the level of segments shared by all processes.

Yet still another object of the instant invention is to provide computer addressing hardware wherein sharing of processes is through indirect access.

Other objects of the invention will become apparent from the description of a preferred embodiment of the invention when read in conjunction with the drawings contained herewith.

SUMMARY OF THE INVENTION

The foregoing objects of the instant invention are achieved by providing addressing hardware and an address development method which operate on a number of address elements to compute an absolute address which is used to refer to a byte location in core.

A number of modes of address development are available, and hardware checks are carried out during address development to insure that the absolute address obtained is the one referenced.

The fundamental vehicle for addressing is the segment. An address space is defined for a process comprising the set of logical addresses that the hardware is permitted to transform into absolute addresses during the execution of the process. (A logical address typically consists of a pair (s,d) where "s" is the segment number, and "d" the displacement.) The hardware is given tables, the segment tables, defining the address space of the process. A segment table (st) contains one entry, or segment descriptor, for each segment. Each segment descriptor contains all attributes of the segment, among which are the absolute core address of the segment and the length of the segment.

An instruction may access an operand either directly or indirectly via a data descriptor wherein an address syllable in the instruction is used for reference, and specifies whether reference is direct or indirect, and moreover specifies a base register which defines the segment to be referenced and also defines an offset within the segment. The address syllable further contains a displacement from the defined base.

Address development hardware obtains the absolute address of the beginning of the segment, adds to this, the offset defined in the above registers, the displacement defined by the instruction and, if required, the contents of an index register. This summation produces the required absolute address.

In greater particularity, the invention contemplates a data processing system including apparatus for addressing operands within a segment utilizing segment descriptors. The apparatus is responsive to instruction words executed by a first of a plurality of processes and has stored therein a plurality of different types of groups of informational data, each data group type being associated with an address space bounded by a segment having predetermined bounds. The apparatus develops the segment relative address (SRA) of the operand contained within any segment. First means stores at least one segment table containing a plurality of segment descriptors having a predetermined format, each of the segment descriptors describing one segment associated with a predetermined one of the segment descriptors. The description includes access information: i.e., whether or not the one segment is private to the first process. Each of the segment descriptors contains a base address of its associated segment. A pluarlity of second means, each selectively coupled to the first means and responsive to a selected one of the instruction words, has a predetermined format for storing a segment number SEG for identifying a segment table and the location of a segment descriptor within the segment table. The second means also stores an offset address within the segment identified by the segment descriptor; the offset address locates from the segment base the first byte of a word within a segment. Third means is responsive to the address syllable element of an instruction being executed for addressing one of the plurality of second means. Fourth means stores a displacement D from the address syllable; the displacement D locates from the first byte of the word within the segment any other byte of the word. Fifth means is coupled to the second and fourth means for adding the displacement D to the offset whereby the SRA is developed. Sixth means stores an index for addressing the next sequential word following the currently addressed word and is responsive to a selected one of the instruction words. The sixth means adds the index to the displacement D and to the offset. Seventh means generates an absolute address of an operand contained with the segment. The seventh means is coupled to the first and fifth means for adding the segment relative address SRA to the base address of the segment descriptor associated with the segment. Eighth means is coupled to the sixth means for incrementing the absolute address location of the operand to the next word following the currently addressed word. The apparatus may use direct or indirect segmented address development and may develop the absolute address of the operand.

BRIEF DESCRIPTION OF THE DRAWINGS

The novel features which are characteristic of the invention are set forth with particularly in the appended claims. The invention itself, however, both as to organization and operation together with further objects and advantages thereof may best be understood by reference to the following description taken in conjunction with the drawings in which:

FIG. 1 is a schematic diagram of a number of segments is main memory.

FIGS. 2A-2M are schematic diagrams of various novel hardware structures utilized in the invention.

FIGS. 2A-2B are segment descriptors.

FIGS. 2C-2E are data descriptors while

FIG. 2CDE is an extended data descriptor.

FIGS. 2F-2G are base registers.

FIGS. 2H-2I are address syllables.

FIGS. 2J-2K are effective address elements.

FIG. 2L is a typical address space word ASW.

FIG. 2M is a typical segment table word, STW.

FIG. 3 is a schematic diagram of segment descriptor sharing and usage by various processes.

Figure 2A:
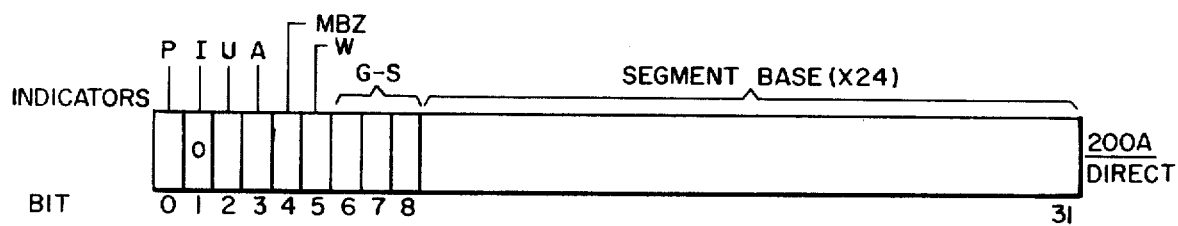

DETAILED DESCRIPTION OF THE INVENTION General:

At the outset, from the foregoing "Background" and "Summary" of the invention, it will be appreciated that the subject invention is particularly applicable to large-scale-multiprogrammed computer systems wherein it is desirable to efficiently utilize memory. The present invention is disclosed at what may be termed the "register transfer" level wherein what specifically is disclosed are data structures, register structures, a minimum of hardware, and operations to be performed. It will further be appreciated by those skilled in the art that the control sections of large scale digital computers are increasingly implemented through microprogrammed control, stored in a high-speed memory, with either read-only or writable control storage. See, for example, the extensive treatment of this subject in a book by Samir S. Husson, "Microprogramming Principles and Practices", Prentice-Hall, Inc., publisher, 1970, the entire disclosure of which is hereby incorporated by reference. In particular, from Chapter 1, "Principles of Microprogramming", pages 1-21, it will be appreciated that, once operations and the order of these performances are described, then the control section can be microprogrammed by a person of ordinary skill in the art to provide the signals which open and close various gates and transfer information from one register to another.

In earlier less, sophisticated computer systems, programs were run one at a time, with each program having access to all memory resources. In most instances, the allocation of memory was very straightforward. However, is instances where the program exceeded the available memory, the programmer was required to partition his program and/or data and control the loading of such partitions.

In a multiprogramming environment, there are many programs in memory at any given time. Therefore, the problem of absolute memory allocation, as discussed previously, is enormous. To ease the problem, a system of dynamically allocating memory space is assumed by a combination of the operating system and the hardware. Because of the random size of program, this system allocates memory into variable size segments and has facilities to restructure the memory allocation within the course of a program run. Thus a program may have a number of memory segments allocated to it that are not in consecutive areas of memory (see FIG. 1.) Referring to FIG. 1 the random access memory of a general purpose computer is shown with five different segments of three different programs A, B, and C stored therein. Segment 1 of program A is stored in a portion 101 of main memory, a segment 3 of program B is stored in a portion 102 of main memory, a segment 6 of program C is stored in a portion 103 of main memory, a segment 2 of program B is stored in a portion 104 of main memory, whereas a segment 2 of program A is stored in a portion 105 of main memory. Other portions of the extent of the total capacity of main memory may also be stored in various segments of different program and/or data.

This procedure would normally present a problem, in that all memory addresses in a program would have to be modified whenever a program or program segment was reallocated. However, to alleviate this problem, the invention utilizes a technique wherein addresses contained in the user's program are logical rather than absolute main memory addresses. (See Glossary of Terms for definition). These logical addresses are then used to develop absolute main memory addresses. Using this technique, user programs may be written without regard to absolute main memory locations.

Figure 2B:
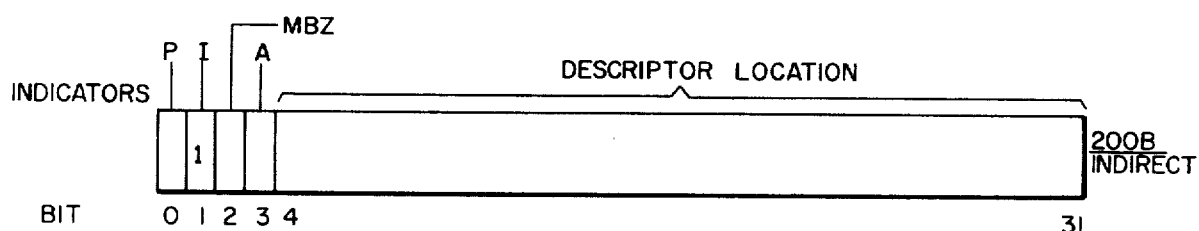

This memory allocation system permits each process (see Glossary of Terms for definition) to access its own or related memory segments via a system of segment descriptors. The format of a segment descriptor is as shown on FIGS. 2A and 2B. Referring to FIGS. 2A and 2B there is shown the format of a direct segment descriptor 200A and an indirect segment descriptor 200B. The direct segment descriptor describes and points to a segment whereas the indirect segment descriptor points to another segment descriptor. Referring to FIG. 2A a presence indicator P is shown at bit position 0. The presence indicator P is a one-bit P-field which when set to "1" indicates that a segment is defined in main storage for the segment number to which that descriptor corresponds. If the P-field is cleared to "0", no segment is defined and the reference to the segment descriptor causes a missing segment exception. The one-bit I-field at bit position one is an indirect bit I and indicates that the descriptor contains the absolute address of another segment descriptor, not the address of the base of a segment. The access field of the indirect descriptor I is utilized by access-protection tests (which is the subject of another invention) in place of the access field of the segment descriptor to which the indirect descriptor points. A "used-flag" U field in bit position 2 indicates whether or not the segment has been accessed. If the flag U is set to "0" the segment has not been assessed whereas if the flag U is set to "1" it indicates that the segment has been accessed. The "written-flag" W field at bit position 5 is used to indicate whether or not the segment has been written into. If written-flag W is set to "0" it indicates that the segment has not been written into, whereas if W is set to "1" it indicates that the segment has been written therein. These flags are updated by firmware at each segment access, including indirect addressing and procedure or semaphore gating (the subject of another invention.) Available bit A located in bit position 3 is a one-bit A-field which indicates whether or not the segment is available. If indicator A is set to "1" the segment to which the descriptor corresponds may be accessed (i.e. it is unlocked) whereas if indicator A is set to "0" the segment is locked, and a reference to the segment descriptor causes a locked segment exception. Gating indicator G-S is a two-bit G-S field which is checked when predetermined instructions are to be executed. For example, the Enter Procedure (ENT) instruction, (not shown) requires that the G-S field contains the code 10 whereas instructions on semaphores require the code 01. Any code other than that required will cause an invalid segment descriptor exception. The MDS field located at bit position 4 indicates when set to "0" that the segment addressed is no larger than a predetermined size, and an invalid segment descriptor exception results if MBS is not set to "0". The segment base X24 in the direct segment descriptor is a 24-bit base field which indicates the absolute address of the base of a segment defined in the direct segment descriptor. The indirect segment descriptor shown on FIGS. 2B has a reduced number of indicators and a 28-bit descriptor location field which defines the absolute address of a direct descriptor. The P, I, MBZ, A indicators of indirect descriptor 200B on FIG. 2B perform the equivalent functions for the indirect descriptor that these indicators perform for the direct descriptor.

To provide maximum flexibility, each process has the capability of accessing typically 2,048 memory segments, although the capability may be for any other number, greater or less. Normally, this would require up to 2,048 segment descriptors per process. However, in a group of processes running together, there is normally a large number of segments being used by more than one process. Therefore, segment descriptors are grouped in segment tables depending on whether they can be accessed by one process, a group of processes (job) or any process in the system. (This grouping also is an aid in program protection.) Thus, a series of segment descriptor tables is formed for single program use, multiprogram use, or system-wide use. Utilizing this system, each segment has only one segment descriptor. Thus, the amount of memory space required for segment descriptors is decreased and the amount of updating during memory reallocation is decreased. FIG. 3 illustrates this feature of the invention. Referring to FIG. 3 the segment descriptors are organized into 3 different segment descriptor tables 304, 305, and 306. Segment descriptor table 304 is a table of common segment descriptors which is indicated by the fact that processes A, B, and C of blocks 301, 302, and 303, respectively may access table 304 as shown by arrows 307, 308, and 309. Moreover it will be seen that only processes B and C shown by blocks 302 and 303 respectively may access job segment descriptors 305, whereas only process C of block 303 may access process C segment descriptors 306.

Because of the great number of jobs that may be present in the system, and therefore the number of segment tables, each process must be able to determine which segment tables it is allowed to access. To provide this capability, each process has two segment table word arrays. The segment table word arrays contain the addresses of all segment tables the process may access. The segment tables contain the segment descriptors hereinbefore described. The segment table word arrays (STWA) contain segment table words (STW's) the form of which is shown on FIG. 2N.

Referring to FIG. 2N the size field STSZ (bit position 0-7) defines the total number of segment descriptors in the segment table. The number may vary from 0 to 4 for the STW's in the array no. 0 pointed to by address space word ASW no. 0 (to be later described); and from 0 to 225 for the STW's in array no. 1 pointed to by the ASW no. 1. When STSZ is equal to "0" the segment table is empty. The segment table address field STA (bits 8-31) define the absolute address of the segment table which is equal to:

66×STA in bytes.

Figure 2C:
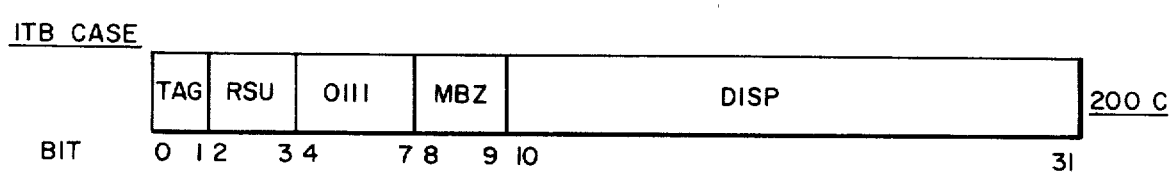
Figure 2D:
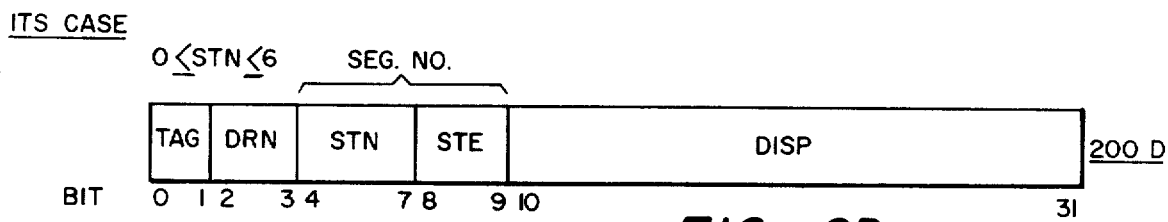
Figure 2E:
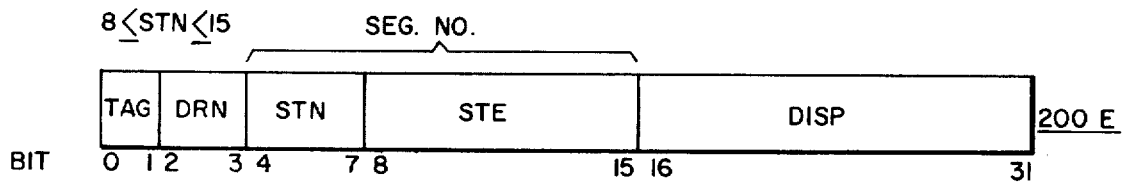
Figure 2J:
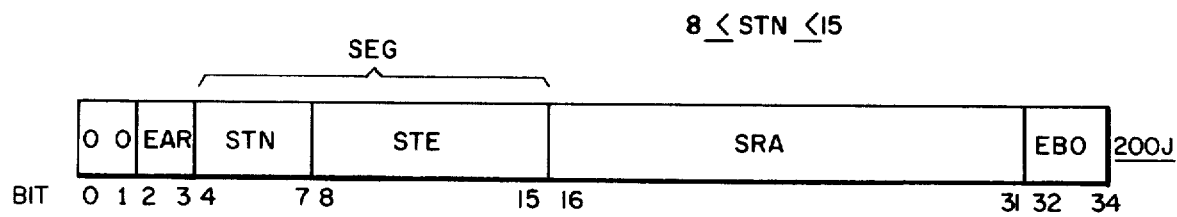
Figure 2K:
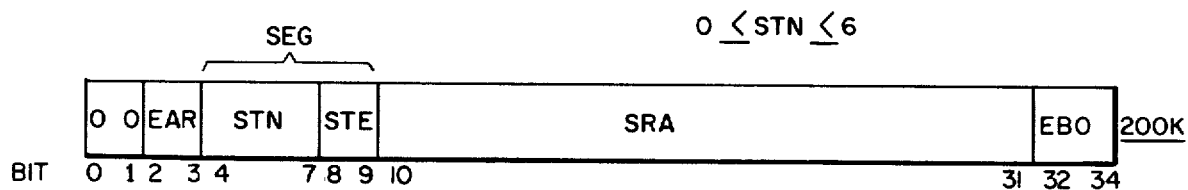
Figure 2L:
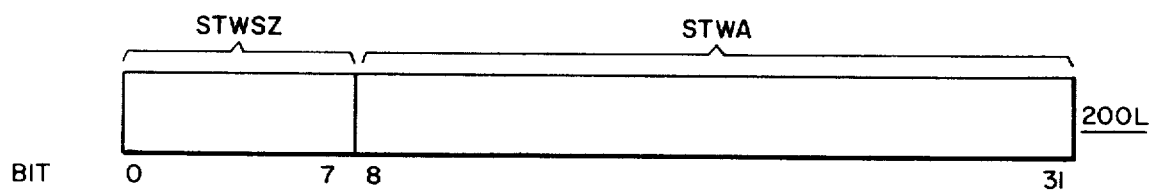
Figure 2M:
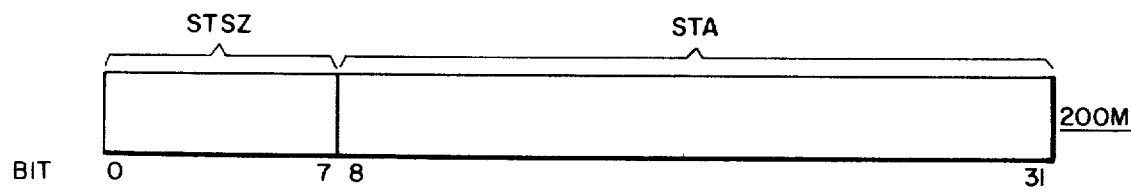

Segment table word arrays STWA are identified by the address space words ASW previously mentioned and having the format shown on FIG. 2L. Referring to FIG. 2L the format of an ASW, it will be noted, is similar to the format of STW; however, the STWSZ field refers to the size of the array. The maximum value of STWSZ is 6 for ASW no. 0, and 8 for ASW no. 1. The STWA field (bits 8-31) addresses the absolute address of STWA of the array in units of 16 bytes.

Figure 4:
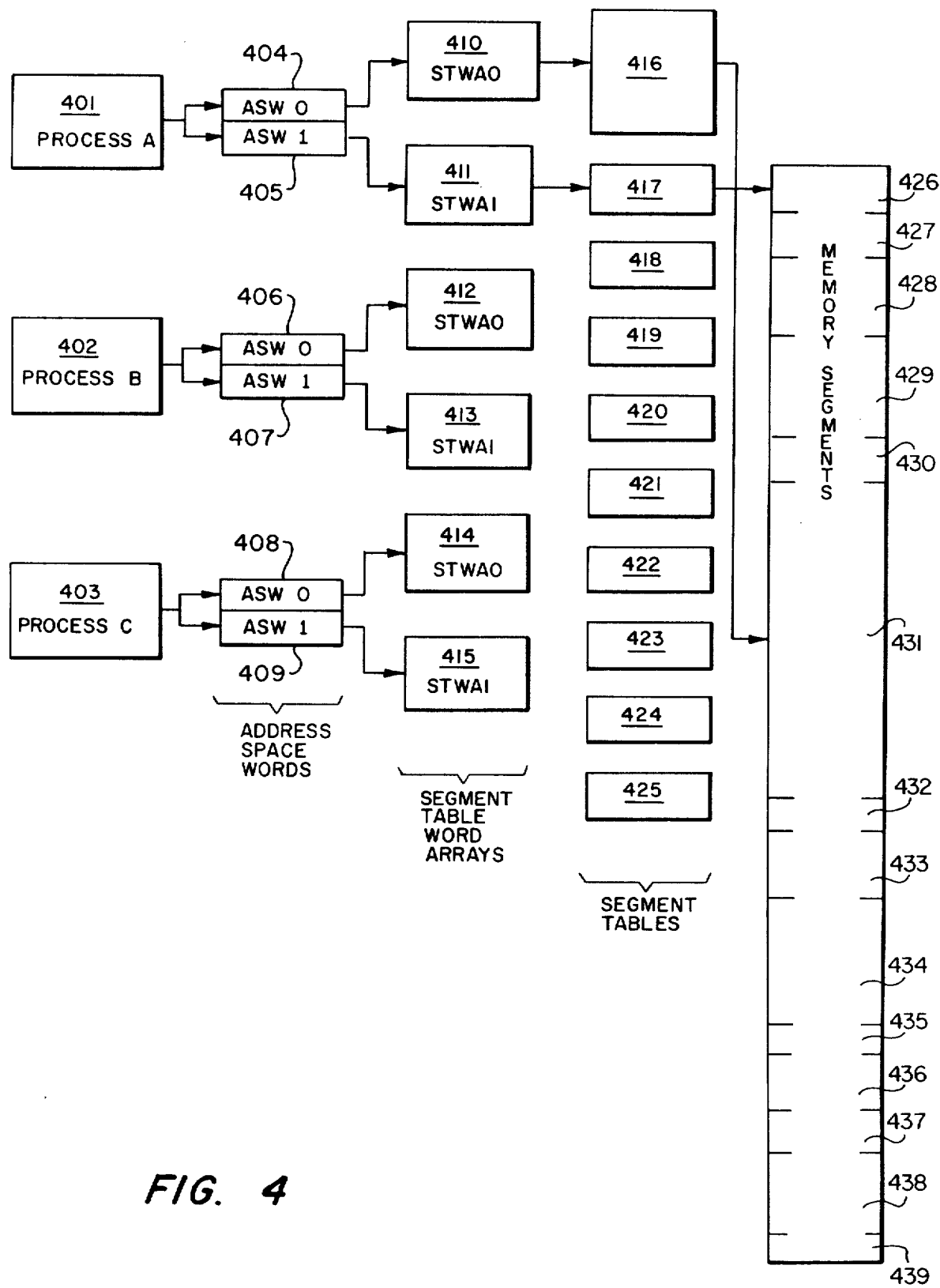
FIG. 4 is a schematic diagram of the general segmented addressing hardware structures and general segmented addressing method flow.

Referring now to FIG. 4 some general of segmented addressing structures are shown whereby a given process may access an authorized segment. A given process A, B, or C indicated by blockd 401, 402, or 403 respectively has associated with it two address space words ASW0 and ASW1 represented by blocks 404 through 409. The address space words ASW are located in a process control block PCB that is created by a given process. (A process control block is associated with each process and contains pertinent information about its associated process, including the absolute starting address of tables defining the segment tables the process may access.) Each process requires two address space words ASW because two types of segments may be associated with each process-- very large segments having a displacement range ($2^{22}-1$), and a large number of smaller segments having displacement from zero through ($2^{16}-1$). The address space words 404–409 provide the address of the segment table word arrays STWA's 410 through 415. The segment table word arrays STWA's contain the STW descriptors previously described and provide the address of the segment tables that the associated process may access. The segment tables 416–425 contain the segment descriptors previously described are utilized to define a particular segment 426–439 in main memory location.

Address Development

The development of an absolute main memory address consists of two phases: (1) the development of an effective address from an address syllable containing a logical address; (2) and the development of an absolute address from the effective address. A segment relative address (SRA) is developed from information contained in an address syllable and information contained in a base register wherein the SRA consists of adding the offset in the base register to the displacement in the address syllable to obtain a segment relative address SRA. The effective address is obtained by adding the contents of an index register if any to the segment relative address SRA. In the second phase, the absolute address is developed by using the segment number SNG in the base register to access a segment descriptor and adding the base addre s in the segment descriptor to the segment effective address.

Effective Address Development

In effective address development a base register is utilized together with an address syllable. In the instant invention there are typically eight base registers. The format of the base register is shown on FIGS. 2F and 2G. Once again it will be obvious that 2 formats are needed for addressing two different types of segments. The format of the base registers shown on FIGS. 2F and 2G are similar with the exception that the different entities occupy different bit field locations. Referring now to FIGS. 2F and 2G there is shown the TAG which is a 2 bit field which corresponds to the TAG of a data descriptor shown on FIGS. 2C-2E. A 2 bit field RING contains the ring number associated with the segmented address and is utilized for protection purposes. (This concept is the subject of another invention assigned to the instant assignee.) The segment identification field SEG is comprised of the segment table number STW and segment table entry STE and is the field which identifies a segment described in a segment table. The OFFSET is a 16 bit or 22 bit field, depending on segment table number, which defines a positive integer and is used in the process of address development as a pointer within a segment.

The format of the address syllable is shown on FIGS. 2H and 2I. Referring to FIGS. 2H and 2I the indirection bit IND is utilized to specify the direct or indirect addressing mode. When the contents of the indirection bit IND is "0" the direct addressing mode is specified whereas if the content of the indirection bit IND is "1" the indirect addressing mode is specified. The BR field specifies which of the eight base registers is to be referenced by the effective address development mechanism. The indexing bit IDX is utilized to specify whether or not an index register is to be utilized in address development and also the length of the displacement field D. If the contents of IDX is "0" it indicates that no index register is to be used and that the displacement D is 15 bits long. If the index bit IDX is equal to "1" it indicates that an index register specified by the field IXR is to be used and that the displacement field D is 12 bits long. Therefore, it is seen that the format of FIG. 2I is the indexing format of the address syllable. The IXR field exists only if IDX is equal to one and specifies the index register to be referenced by the effective address development. The displacement D specifies a positive integer to be used as a displacement. If IDX is equal to "0", the maximum value of D is $(2^{15}-1)$; whereas if IDX is equal to "1" the maximum value of D is $(2^{12}-1)$. It will be noted that the address syllable format begins with bit 12 and ends with bit 31. The reason for this is that the address syllable usually comprises a portion of an instruction and is incorporated into the instruction beginning at bit 12.

The development of an effective address from an address syllable may proceed in four different ways: (1) The effective address development may be direct; (2) the effective address development may be indirect; (3) the effective address development may be direct and indexed; and (4) the effective address development may be indirect and indexed. All four types of address syllables contain a base register field (BR); the base register field is used to access a base register, the contents of which may be in the two formats 200F and 200G of FIGS. 2F and 2G respectively. The contents of the base register are manipulated by user programs utilizing a Load Base Register Instruction (not shown).

Figure 5:
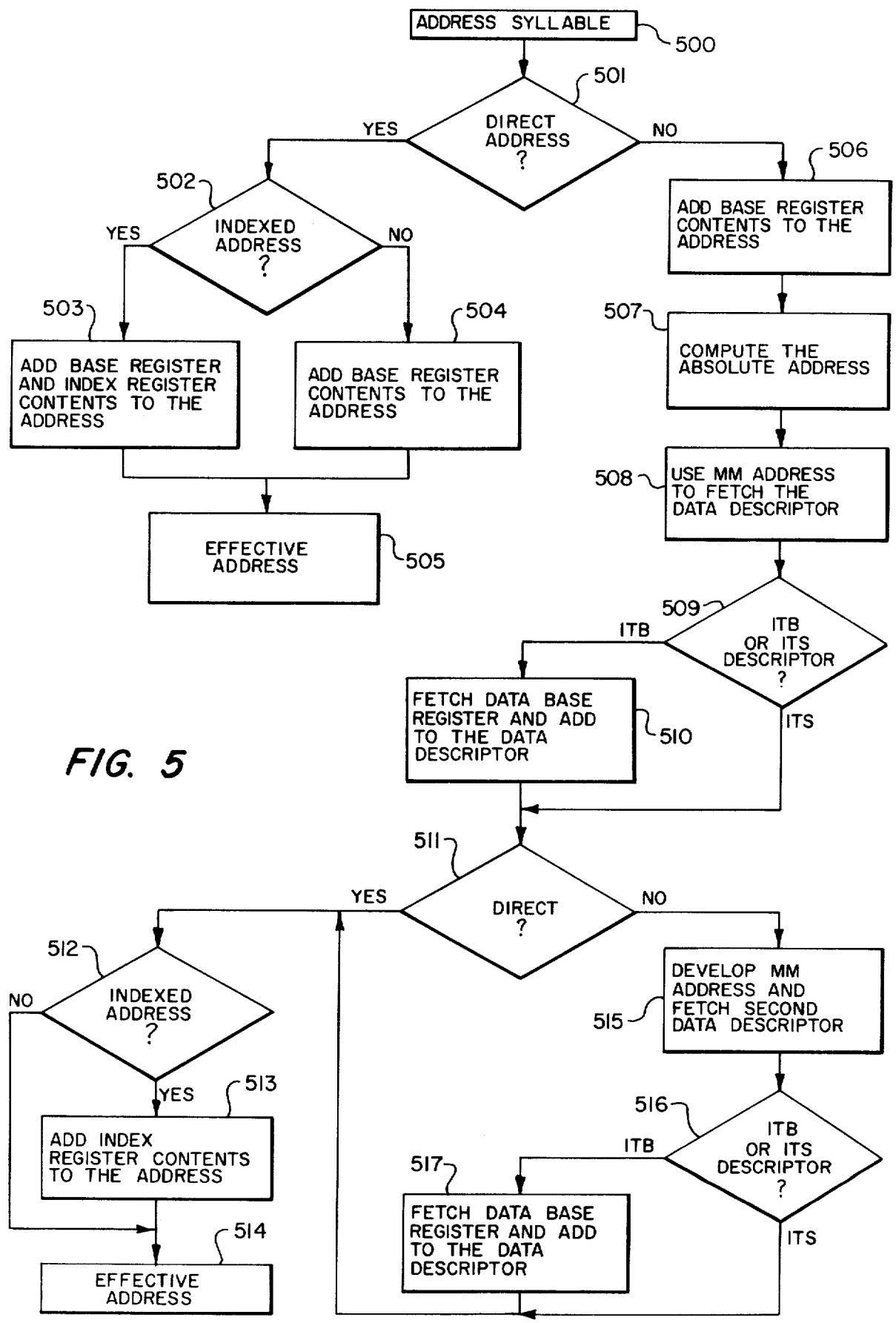
FIG. 5 is a segmented addressing development flow chart for effective address development by direct and indirect address development.
Figure 6:
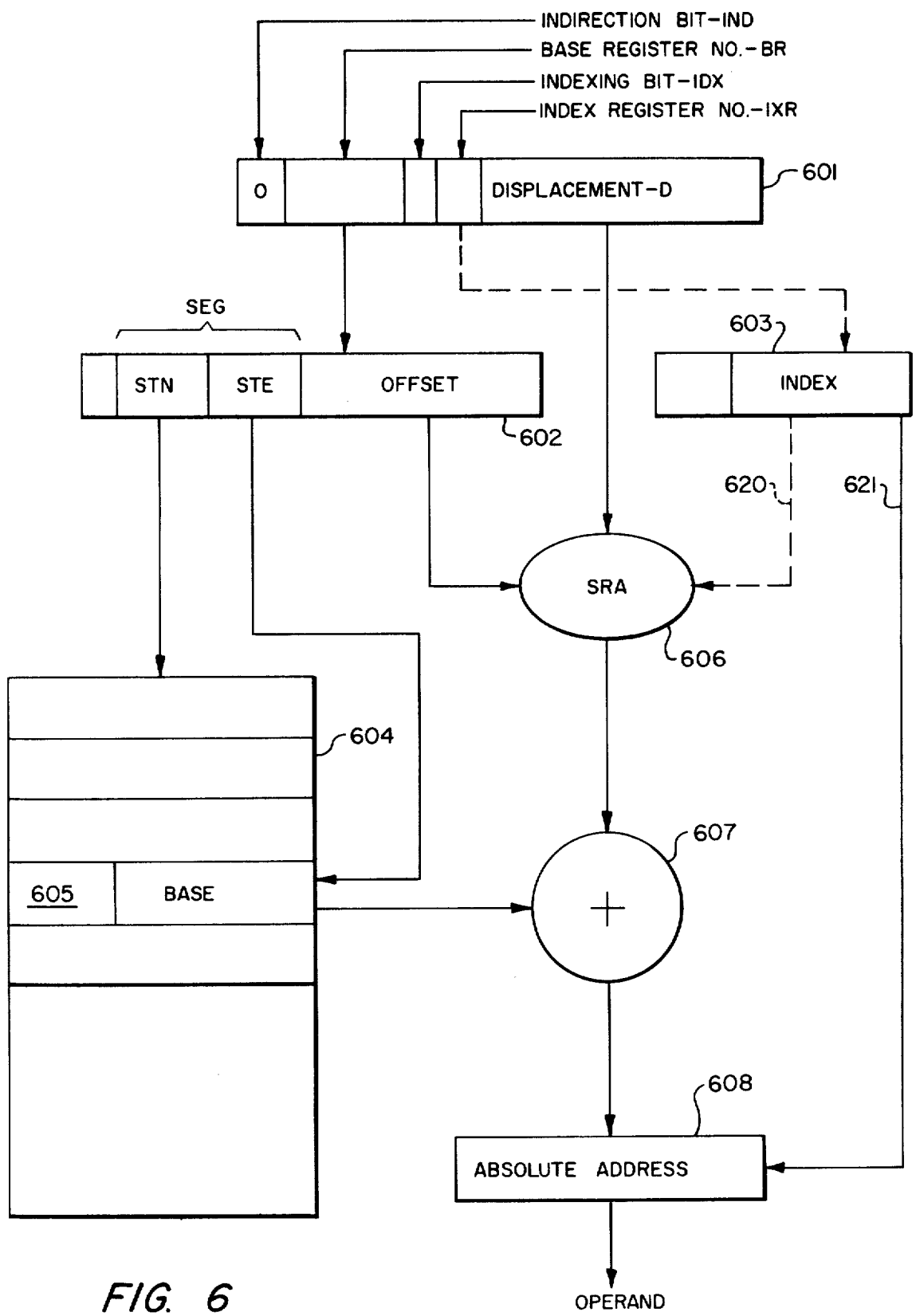
FIG. 6 is a schematic diagram of hardware for direct segmented address development.

The direct method of effective address development is shown on FIG. 5 and FIG. 6. Referring to FIG. 5 and FIG. 6, a direct address syllable 500 on FIG. 5, and 601 on FIG. 6—indicated by having its indirection bit IND set to zero, its index bit IDX set to zero, and a long displacement field D,—points to a base register 602 which provides the segment number SEG of segment table 604 and an offset within that segment table. Segment table 604 contains segment descriptors one of which in this particular example provides a base address for the segment described. Address syllable 601 also provides a displacement D. By adding the displacement D of address syllable 601 to the offset of base register 602 a segment relative address SRA is obtained. The basic elements of the effective address comprise the base of the segment identified by segment number SEG and the segment relative address SRA, and an Index (if any) in index register 603. In another embodiment the index from Index register 602 is not part of the effective address but is applied to the absolute address 608. (See dash dot arrow 620).

The format of the effective address is shown on FIGS. 2J and 2K. Note in this format an additional basic element the EAR (effective address ring number) is included. The EAR is protection information used in accessing storage and has a range of zero to three for operating within any of four privilege rings. (This concept as has been previously noted is the subject of another invention assigned to the instant assignee.) The bit field from bits zero to one has no significance in the effective address but corresponds to the TAG field of a data descriptor. The STN segment table number field defines any of fifteen segment tables associated with a given process. The segment table entry field STE defines a specific entry within a segment table which contains a segment descriptor and defines a specific segment. The segment relative address field SRA is a 16 or 22 bit positive integer specifying the number of bytes from the base of the segment to the first byte of the operand. For a large segment, (segment zero to six), SRA may range from 0 to $(2^{22}-1)$. For small segments (segments eight to fifteen), SRA may range from 0 to $(2^{16}-1)$. The effective address bit-offset (EBO) field exists only when the operand in storage is a bit string (not shown or described herein).

Address development hardware 607 (to be later described in greater detail) obtains the absolute address of the beginning of the segment indicated by the base address of segment descriptor 605 which in turn is referenced by the segment number SEG, and adds the base address to the segment relative address SRA to obtain an absolute address 608.

Referring to FIG. 5 reference numerals 500, 501, 502, 504, and 505 indicate effective address development using a direct syllable. Reference numerals 500, 501, 502, 503, and 505 indicate the second method of effective address development utilizing a direct indexed addressed syllable. The development of an effective address from a direct indexed address syllable (i.e. the indirect bit IND of FIGS. 2H and 2I is "0", the index bix IDX is "1", and a short displacement field is present) proceeds identically to the development from a direct address syllable, with one exception: The segment relative address (SRA is developed by the addition of the displacement field of address syllable 601 of FIG. 6, the offset field in base register 602 and the contents of the index register 603 specified by the index register field IXR of the address syllable.

The indirect or indirect indexed effective address development accesses an operand by one or two levels of indirection i.e. after generating an absolute address from the first effective address a data descriptor is fetched from which another effective address is developed prior to the development of the final absolute address which is actually used to fetch an operand. There are two modes of indirect and indirect indexed address development: one is the indirection to base mode ITB wherein a data descriptor having the format 200C is fetched and the other indirection to segment ITS mode wherein a descriptor having the format 200D is fetched.

Referring to FIGS. 2C through 2E there are shown two different types of data descriptors. FIGS. 2C shows the indirection to base ITB data descriptors whereas FIGS. 2D and 2E show the indirection to segment ITS data descriptors. Another format FIG. 2CDE, is an extended data descriptor and may be appended to the other type data descriptors at bit position 32. There are also two different formats for the ITS data descriptor one being the fomrat of FIG. 2D which is utilized to reference segment table numbers identified as 0 through 6 in the machine generally reference large segment whereas the data descriptor of FIG. 2E is utilized to reference segment table numbers STW identified as 8 through 15 in the machine which are utilized to reference smaller segments. A data descriptor may also reference operands rather than other data descriptors or segment descriptors.

The minimum size of a data descriptor is four bytes. The storage location of a data descriptor is specified by the address of the leftmost byte, which may be any byte address. The data descriptor defines addresses in storage either by an indirection to base (ITB) or by an indirection to segment (ITS). ITB is identified when bits 4 through 7 of the above formats 200-C through 200-E are equal to 0111. ITS is identified when bits 4 through 7 of the data descriptor format are different from 0111. The ITS descriptor specifies a segment number (SEG) comprised of segment table number (STW) and segment table entry (STE) to be used in the development of an effective address. ITB descriptor is an equivalent address syllable that is developed into an effective address via a data base register.

Referring now to FIGS. 2C through 2E, the TAG identifies the type of descriptor. The contents of the TAG is interpreted as follows:
- 00 is the normal direct descriptor which points to data;
- 01 is the extended direct data descriptor wherein the descriptor points to data;
- 10 is the indirect descriptor wherein the descriptor points to another descriptor;
- 11 indicates a fault.

The DRW field indicates the ring number that may be accessed by that particular descriptor. (The concept of ring numbers is the subject of another invention and is described in another patent application assigned to the same assignee as the instant invention). STN indicates the segment table number referenced by that descriptor when bits 4 through 7 of its format contain any number other than 0111. STE the segment table entry typically ranges from 0 to 3 (i.e. references very large segments) for STN between 0 and 6 (format 200D) whereas STN between 8 through 15 range from 0 to 254 (i.e. references smaller segments) (format 200E). The segment table number STN and the segment table entry STE define the segment number SEG. Hence it will be observed that data descriptor format 200D describe four segments identifying segment numbers SEG 0 to 4 in the machine whereas data descriptor having format 200E describe 256 segments identifying segment numbers SEG 0 to 256 in the machine a large number of much smaller segments. The displacement DISP indicates the byte addressed of a word of a segment specified by segment number SEG comprised of segment table number STW and segment table entry STE. As an example therefore and assuming a data descriptor format 200D or 200E, if STW contained the number 5 and STE contained the number 7 and DISP contained the number 4 it would indicate that the 4th byte of a word in the segment indicated by the 7th descriptor in segment table number STW 5 is to be accessed.

An ITB descriptor is an address syllable that is developed into an effective address via a data base register. An ITS descriptor is an effective address used to develop an absolute address. Upon developing an effective address, whether from an ITB or ITS descriptor, a check is made to insure a second level of indirection is not required. If a second level of indirection is not required, a check is made to determine if the index bit in the address syllable equals one. If the index bit equals one, the contents of the index register specified in the address syllable are added to the address. If a second level of indirection is required, it is performed identically to the first level. Thus, any number of levels of indirection are allowed up to 16 levels during segmented address development. Each effective address consists of a segment number, which directs the access to a specific segment of memory, and the displacement, which directs the access to a specific locations within the segment. The segment number is actually composed of two fields as noted supra—the segment table number STN and segment table entry STE. STN is used to develop the address of the segment table whereas STE is used to develop the address of a segment descriptor within the table. As described previously, the segment number is taken from the base register which is accessed by the address syllable. Therefore, the segment number is either 6 or 12 bits, depending on the base register that was accessed and its format which may be either 200F or 200G. Also as previously discussed base register format 200C consists of a 6 bit segment number SEG which is comprised of a 4 bit segment table number STN field and a 2 bit segment table entry STE field. The 4-bit STW field of which the most significant bit equals zero, allows access to 6 segment tables (STN equals to 6 or 7 is illegal). The 2-bit STE field allows 4 segment descriptors within each table or 4 entrys to that table. The size of the segments accessed through these tables may be up to 4 megabytes, since a 22-bit offset is provided. Using this format, a process may access 24 4-megabyte segments (6 segment tables, 4 segment descriptors per table). Base register format 200F provides a 12-bit segment number SEG comprised of a 4-bit segment table number STW field and an 8-bit segment table entry STE field. The 4-bit STW field of which the most significant bit equals one, provides access to 8 segment tables. The 8-bit STE field allows 256 segment descriptors within each table. The size of the segments accessed through these tables may be 64 kilobytes, since a 16-bit offset is provided. This format provides access to 2,048 64-kilobyte segments (8 segment tables, 256 segment descriptors per table). Of course it is understood that different number of tables or segments may be utilized with the invention.

Figure 7:
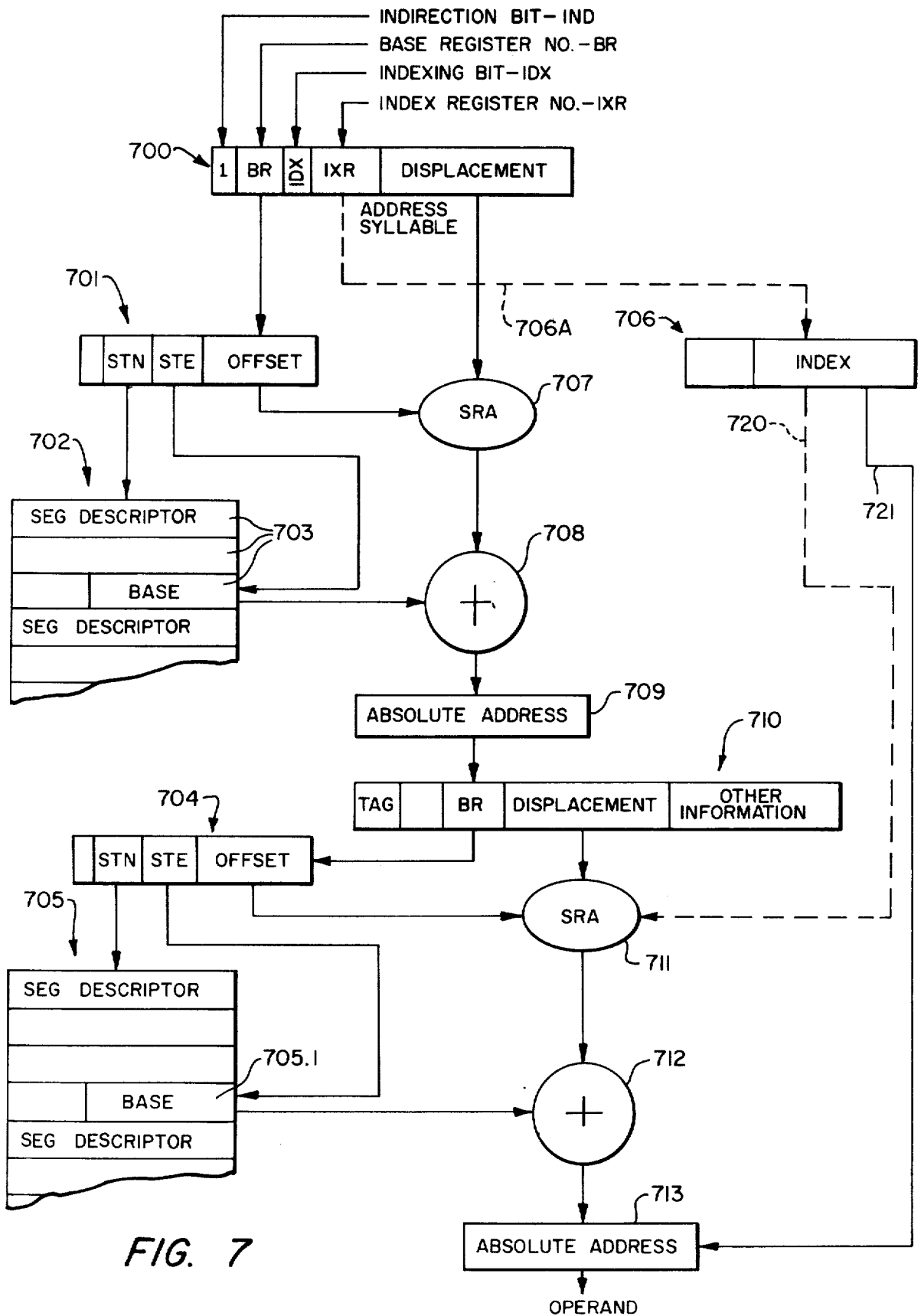
FIG. 7 is a schematic diagram of hardware for indirect segmented address development with indirection to base (ITB).

The flow chart of FIG. 5 reference numerals 506 through 517 show the steps of segmented effective address development for the indirect and indirect index modes. FIGS. 6 and 7 show the hardware requirements for generating the effective and absolute segmented addresses of the indirect and indirect indexed modes. Referring now to FIGS. 5, 6, and 7 a segmented relative address 606 or 711 is developed similarly to the direct mode of segmented addressing, and the effective segmented address is developed utilizing the segment relative address SRA 606 or 711 and the segment table number and segment table entry of base registers 602 or 701. (See formats 200J and 200K discussed supra for formats of the effective address). An absolute address 608 or 709 is developed by a method and absolute addressing hardware to be described later which is then utilized to develop the final effective address which will be utilized to develop the final absolute address which accesses the operand.

Referring more specifically to FIG. 7 and assuming the address syllables 700 has a "1" in its indirection field IND which indicates indirect addressing mode. The base register field BR of address syllable 700 points to base register 701 which in turn provides a segment number SEG (i.e. STN and STE) which in turn provides a segment table entry of segment descriptors 703 which are included in the segment table 702. The indexing bit IDX of address syllable 700 in this particular example is set to "0" and specifies that no index register is to be utilized; if the indexing bit IDX were set to "1" it would specify an indirect indexed mode of addressing and index register 706 pointed to by dashed line 706A would be utilized in the final formation of the segment relative address SRA. The segment relative address SRA 707 is formed from the OFFSET of base register 701 which points to the first byte of a word within a segment whose base location is pointed to by the BASE FIELD of the segment descriptor pointed to by STW and STE and the DISPLACEMENT of address syllable 700 which points to the byte of a word. The segment relative address SRA together with SEG are elements of the effective segmented address in this example because no indexing was required. If indexing was required, the effective address would include the Index. This effective segmented address is utilized by a method and hardware to be described infra, to form an absolute address 709 of a data descriptor. The base register BR field of data descriptor 710 would in this example have the code 0111 which indicates that data descriptor 710 has the indirection to base ITB format (see data descriptor format 200C-200E). The base register field BR of data descriptor 710 also points to the data base register 704. The OFFSET of data base register 704 and the DISPLACEMENT of data descriptor 710 and, when used, the INDEX of index register 706 form the segment relative address SRA 711. The segment relative address SRA 711 together with SEG and an Index (if required) comprise a second segmented effective address which is utilized to form the absolute address 713 of an operand to be accessed in main memory.

Figure 8:
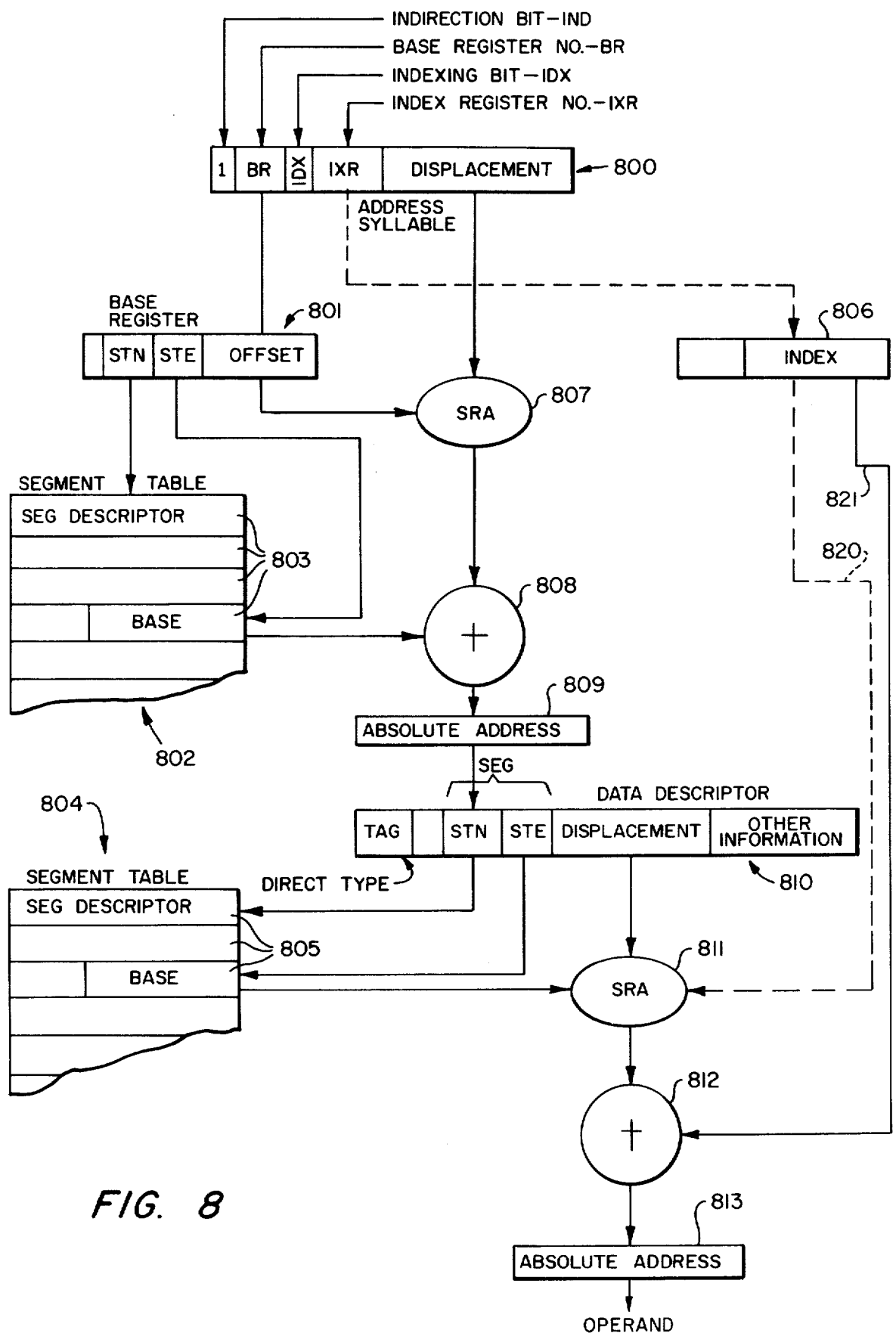
FIG. 8 is a schematic diagram of hardware for indirect address development with indirect to segment (ITS).

Referring now to FIG. 5 reference numerals 506-509, 511, 515-517, and 512-514 and also to FIG. 8 there is shown the method and hardware for indirect address development utilizing indirection to segment ITS mode. Note that the hardware and method are practically similar to the ITB mode with the exception that data descriptor 810 (710 on FIG. 7) does not point to a base register as does data descriptor 710 but rather directly to the segment via its segment number SEG. The format therefore of data descriptor 810 is different than data descriptor 710 in that it has the format 200D or 200E of FIGS. 2D or 2E respectively. In other respects it will be observed that the hardware and method are substantially similar.

Absolute Address Development

Figure 9:
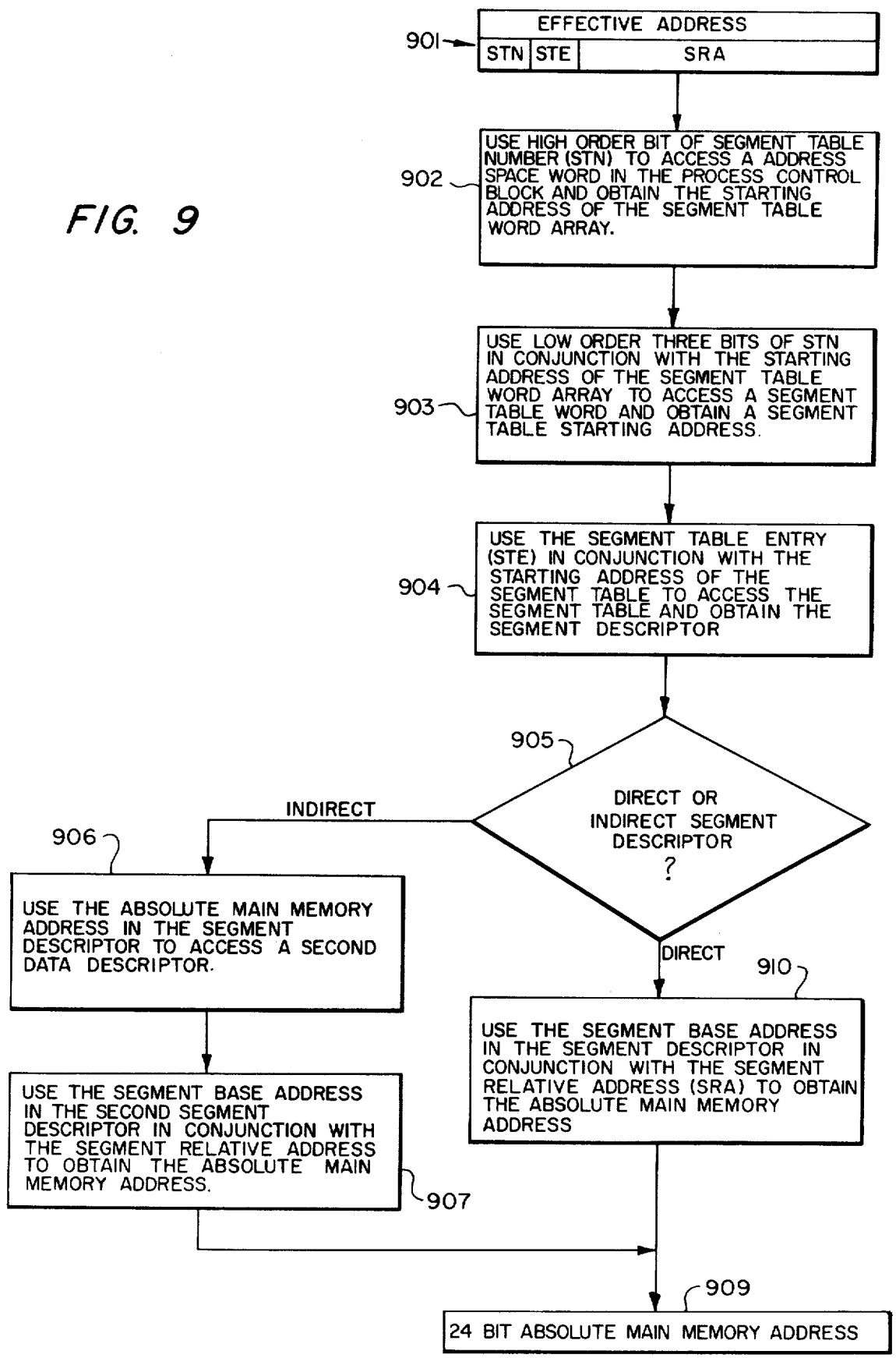
FIG. 9 is a segmented address development flow chart for absolute address development.
Figure 10:
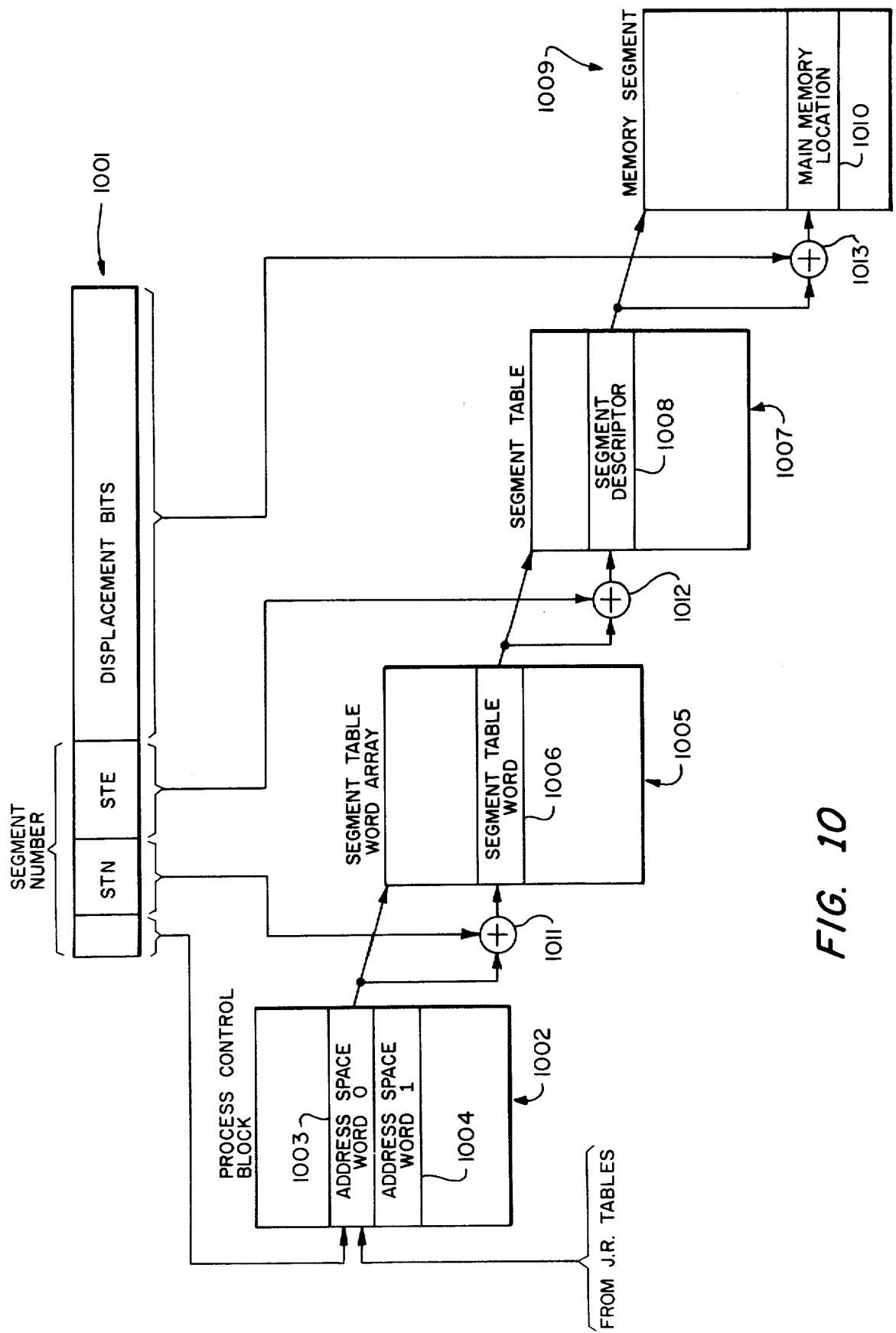
FIG. 10 is a schematic diagram of hardware for absolute address development.

Having developed the elements of segmented effective address the absolute address of the operand or descriptor, as the case may be, can be developed. Referring to FIGS. 9 and 10 there is shown one embodiment of method and hardware for absolute address development. In this embodiment the process control block 1002 is referenced by J.P. tables (see glossary). The high order bit of the segment table number STN of the effective address 1001 is used to access one of two address space words 1003 or 1004. The address space word accessed contains the base address of a segment table word array 1005 the contents of the address space word are added to the low order 3 bits of the segment table number STN of effective address 1001 via adder 1011 to produce the address of a segment table word 1006 within the segment table word array 1005. Each segment table word 1006 contains the absolute starting address of a segment table 1007 which contains segment descriptor 1008. Therefore, reading the segment table word 1006 and adding the segment table entry STE of effective address 1001 via adder 1012 produces the address of a particular segment descriptor 1008 within the segment table 1007. As has been heretofore described segment descriptors contain information about an associated memory segment, including starting or base address of the segment and the length of the segment. Thus, by adding the segments absolute starting address (see format of segment descriptor described supra) and the displacement bits of the segmented relative address of effective address 1001, the desired main memory address 1010 is obtained. It should be noted from the above explanation that the effective main memory address can be referenced to the absolute main memory address only by accessing the segment tables. However, because of the number of memory accesses that must be made to obtain the base address of the memory segment contained in the segment descriptor, an associative memory in the central processing unit typically stores the eight most recently used segment descriptors along with their segment numbers.

Having shown and described four embodiments of the invention, those skilled in the art will realize that many variations and modifications can be made to produce the described invention and still be within the spirit and scope of the claimed invention.

| | GLOSSARY OF TERMS |
|---|---|
| JOB | - The job is the major unit of work for the batch user. It is the vehicle for describing, scheduling, and accounting for work he wants done. |
| JOB STEP | - A smaller unit of batch work. It is generally one step in the execution of a job consisting of processing that logically belongs together. |
| TASK | - The smallest unit of user-defined work. No user-visible concurrency of operation is permitted within a task. |
| PROGRAM | - A set of algorithms written by a programmer to furnish the procedural information necessary to do a job a part of a job. |
| PROCESS GROUP PLEX | - The system's internal representation of a specific execution of a job. |
| PROCESS GROUP | - A related set of processes, usually those necessary for performance of a single job step. |
| PROCESS | - The controlled execution of instructions without concurrency. Its physical representation and control are determined by internal system design or convention. |
| PROCEDURE | - A named software function or algorithm which is executable by a computational processor without concurrency. Its physical representation (code plus associated information, invocation, and use are determined by internal system or designed convention. |
| LOGICAL PROCESS | - The collection of hardware resources and control information necessary for the execution of a process. |
| ADDRESS SPACE (SEGMENTATION) | - The set of logical addresses that the CPU is permitted to transform into absolute addresses |

| | -continued |
|---|---|
| | GLOSSARY OF TERMS |
| | during a particular process. Although a processor has the technical ability of addressing every single cell of timing memory, it is desirable to restrict access only to those cells that are used during the process associated with the processor. |
| LOGICAL ADDRESS | - An element of the process address space such as for example segment number SEG and Displacement D. |
| BASIC ADDRESS DEVELOPMENT | - A hardware procedure which operates on a number of address elements to compute an absolute address which is used to refer to a byte location in core. |
| PROCESS CONTROL BLOCK | - A process control block PCB, is associated with each process and contains pertinent information about its associated process, including the absolute address of tables defining the segment tables the process may access. |
| J.P. TABLES | - A collection of logical addresses for locating a process control block associated with a process. |

What is claimed is:

1. In an internally programmed data processing apparatus responsive to instruction words being executed by a first of a plurality of processes and having stored therein a plurality of different types of groups of informational data, each data group type associated with an address space bounded by a segment having predetermined bounds, an apparatus for developing the segment relative address (SRA) of an operand contained within any segment comprising:
   a. first means for storing at least one segment table containing a plurality of segment descriptors having a predetermined format, each of said segment descriptors describing one segment associated with a predetermined one of said segment descriptors, each segment descriptor being accessible only by any number of particular predetermined ones of said plurality of processes to control access rights to said segment, and with each of said segment descriptors containing a base address of its associated segment;
   b. a plurality of second means, each selectively coupled to said first means and responsive to a selected one of said instruction words and having a predetermined format for storing a segment number SEG for identifying a segment table and the location of a segment descriptor within said segment table, said second means also for storing an offset address within the segment identified by said segment descriptor, said offset address for locating from said segment base address the first byte of a word within said segment;
   c. third means responsive to an address syllable element of an instruction being executed for addressing one of said plurality of second means;
   d. fourth means for storing a displacement D from said address syllable, said displacement D for locating from the first byte of said word within said segment any other byte of said word; and
   e. fifth means coupled to said second and fourth means for adding said displacement D to said offset whereby said SRA is developed.

2. An apparatus as recited in claim 1, including sixth means for storing an index for addressing the next sequential word following the currently addressed word and responsive to a selected one of said instruction words, said sixth means for adding said index to said displacement D and to said offset.

3. An apparatus as recited in claim 1, including seventh means for generating an absolute address of an operand contained with the segment, said seventh means coupled to said first and fifth means for adding said segment relative address SRA to said base address of said segment descriptor associated with said segment.

4. An apparatus as recited in claim 3, including eighth means coupled to said sixth means for incrementing said absolute address location of said operand to the next word following the currently addressed word.

5. In an internally programmed data processing apparatus including a plurality of base registers, said apparatus being responsive to internally stored instruction words being executed by a first process of a plurality of processes and having stored in said data processing apparatus a plurality of different types of groups of informational data, each data group type associated with an address space bounded by a segment having predetermined bounds, an apparatus for developing by indirection to said base registors the segment relative address (SRA) of an operand contained within any segment comprising:
   a. first means for generating the absolute address of a first data descriptor, and first data descriptor containing a base register address element for identifying one of a plurality of said base registers containing first address elements of the address of a first operand to be accessed within said segment, and said data descriptor also providing the second address elements of said first operand to be accessed within said segment said first operand being a second data descriptor;
   b. second means for storing at least one segment table containing a plurality of segment descriptors having a predetermined format, each of said segment descriptors describing one segment associated with a predetermined one of said segment descriptors and each of said segment descriptors containing a base address of its associated segment, said predetermined one of said segment descriptors being identified by an element of said address in said base register.
   c. third means coupled to said first and second means for generating a segment relative address (SRA) of said first operand from said first and second address elements.

6. The apparatus as recited in claim 5, including fourth means coupled to said second and third means for generating from said SRA and said base address the absolute address of said first operand contained within said segment.

7. The apparatus as recited in claim 5 wherein said first address elements include a segment number SEG and an offset address, said segment number for locating said predetermined one of said segment descriptors in said segment table, and said offset address for addressing said first operand from a base location within said segment said beam location being at the beginning of the boundary of said segment.

8. The apparatus as recited in claim 7, wherein said second address elements include a displacement address, and wherein said first operand comprises a word having a plurality of bytes, said displacement address for locating any byte of said word referenced from the beginning of the first byte of said word.

9. The apparatus as recited in claim 8 wherein said fourth means for generating the segment relative address (SRA) adds said offset address and said displacement address.

10. The apparatus as recited in claim 9, wherein said fourth means for generating the absolute address of said first operand contained within said segment adds said SRA to said base address.

11. In an internally programmed data processing apparatus having a plurality of base registers, said apparatus being responsive to internally stored instructions being executed by a first process of a plurality of processes and having stored within said data processing apparatus a plurality of different types of groups of informational data, each data group type associated with an address space bounded by a segment having predetermined bounds, an apparatus for developing by n indirections to one of said plurality of base registers the segment relative address (SRA) of a final operand word contained within a selected segment comprising:
   a. first means for storing a plurality of segment tables, each segment table containing a plurality of segment descriptors, each descriptor having a predetermined format, with predetermined ones of said segment descriptors associated with predetermined segments on a one to one basis, each of said segment descriptors describing its associated segment and each of said segment descriptors containing a base address element of its associated segment, each segment descriptor being accessible only by any number of particular predetermined ones of said plurality of processes to control access rights to said segment, said base address element for locating the base location of the beginning of said associated segment, a predetermined one of said segment descriptors being identified by a first address element stored in one of said base registers;
   b. second means selectively coupled to said first means for storing an address syllable of a selected one of said instructions, said address syllable containing a base register address element for identifying one of a plurality of said base registers, said one of said base registers containing a second address element for addressing a first operand word within a first segment from the base location of said first segment, said adddress syllable also containing a first displacement address element for addressing at least one byte of said first operand word, said byte addressed relative to the beginning of the first byte of said first operand word;
   c. third means coupled to said first and second means for generating the absolute address of a data descriptor from said second address element, from said first displacement address element and from said base address element, said data descriptor containing a second base register address element for identifying a second of said plurality of base registers containing third address elements of the address of the final operand to be accessed within a second segment, said data descriptor also containing a second displacement address element for addressing at least one byte of a second operand word, said byte addressed relative to the beginning of the first byte of said final operand word; and
   d. fourth means responsive to said third address element and to said second displacement address for generating a segment relative address of said final operand from said third address element and said displacement address element.

12. The apparatus as recited in claim 11 wherein said third address element in said second of said plurality of base registers contains a segment number SEG for locating a predetermined second of said segment descriptors associated with said second segment, and wherein said third address element in said second plurality of base registers contains an offset address element for locating the final operand within said second segment relative to the base address of said second segment.

13. The apparatus as recited in claim 12, including fifth means coupled to said offset address element and to said segment reltive address (SRA) for generating an absolute address of the final operand word of said offset address element and said segment relative address of sais final operand.

14. An apparatus as recited in claim 13 wherein said fifth means for generating the absolute address of said final operand word is an adder and whereby said offset is added to said segment relative address (SRA).

15. In an internally programmed data processing apparatus having a plurality of base registers, said apparatus being responsive to internally stored instructions being executed by a first of a plurality of processes and having stored within said data processing apparatus a plurality of different types of groups of informational data, each data group type associated with an address space bounded by a segment having predetermined bounds, an apparatus for developing by n indirections to one of a plurality of segment tables the segment relative address (SRA) of a final operand word contained within a selected segment comprising:
   a. a first means for storing a plurality of segment tables, each segment table containing a plurality of segment descriptors, each descriptor having a predetermined format, with predetermined ones of said segment descriptors associated with predetermined segments on a one to one basis, each of said segment descriptors describing its associated segment, each segment descriptor being accessible only by any number of particular predetermined ones of said plurality of processes to control access rights to said segment, and each of said segment descriptors containing a base address element of its associated segment, said base address element for locating the base location of the beginning of said associated segment, a predetermined one of said segment descriptors associated with a first of said segments being identified by a first address element stored in one of said base registers;
   b. second means coupled to said first means for storing an address syllable of said instruction, said address syllable containing a base register address element for identifying one of a plurality of said base registers, said one of said base registers containing a second address element for addressing a first operand word within a first segment from the base location of said first segment, said address syllable also containing a first displacement address element for addressing at least one byte of said first operand word, said byte being addressed relative to the beginning of the first byte of said first operand word, said first operand word being a first segment descriptor;

c. third means coupled to said first and second means for generating the absolute address of said first segment descriptor utilizing said second address element, said first displacement address element and said base address element, said first segment descriptor containing a third address element of the address of the final operand to be accessed within a second segment, said first segment descriptor also containing a second displacement address element for addressing at least one byte of said final operand word, said byte addressed relative to the beginning of the first byte of said final operand word; and d. fourth means responsive to said third address element and said displacement address element for generating a segment relative address (SRA) of said final operand word utilizing said third address element and said second displacement address element.

16. The apparatus as recited in claim 15 wherein said third address element of said data descriptor contains a segment number SEG for locating a predetermined second segment descriptor of said segment descriptors associated with said second segment.

17. The apparatus as recited in claim 16, wherein said first segment descriptor is a direct type data descriptor and said second segment descriptor contains a second base address element of the beginning of said second segment, said apparatus including fifth means responsive to said second displacement address element and said second base address element for generating an absolute address of the final operand word utilizing said second displacement address element and said second base address element of said second segment descriptor.

18. An apparatus as recited in claim 17 wherein said fifth means for generating the absolute address of said final operand word is an adder and whereby said second displacement and said second base address element are added together.

19. The apparatus as recited in claim 18, including indexing means coupled to said adder for indicating the incrementing of the absolute address location of said final operand to the next sequential word following the currently addressed word.

20. The apparatus as recited in claim 18, wherein said indexing means indicates the incrementing of the SRA of said final operand to the next SRA word following the current SRA word.

21. In an internally programmed data processing apparaus having a plurality of first storage means for storing elements of an address of a final operand, said apparatus responsive to instruction words being executed by a first process of a plurality of processes, said first storage means having stored therin a plurality of different types of roups of informatinal data, each data group type associated with an address space bounded by a predetermined segment of a plurality of segments having predetemined bounds, an apparatus for developing an absolute address of said final operand contained within said predetermined segment, said apparatus comprising:

a. first means responsive to a first address element contained within said instruction words and said second address element contained within said first storage means, said first means generating in response to a predetermined one of said first address elements and to a predetermined one of said second address elements a segment relative address (SRA) of said final operand;

b. second means for storing at least one segment table containing a plurality of segment descriptors having a predetermined format, each of said segment descriptors describing one of said plurality of segments, each segment descriptor being accessible only by any number of particular predetermined ones of said plurality of processes to control access rights to said segment, said one segment associated with a predetermined one of said segment descriptors, and each of said segment descriptors containing a base address of its associated segment; and c. third means coupled to said first and second means for generating from said base address and said segment relative address (SRA) the absolute address of said final operand.

22. The apparatus as recited in claim 21, including indexing means coupled to said third means for indicating the incrementing of the absolute address location of sad final operand to the next sequential word following the currently addressed word.

23. The apparatus as recited in claim 22, including indexing means for indicating the incrementing of the SRA of said final operand to the next SRA word following the current SRA word.

24. In an internally programmed data processing apparatus having a plurality of base registers, said apparatus being response to internally stored instruction words and having stored within said data processing apparatus a plurality of different type of groups of informational data, each data group type associated with an address spaced bounded by a predetermined segment of a plurality of segments having predetermined bounds, the method of developing an absolute address of a final operand contained within said predetermined segment, said method comprising the steps of:

a. accessing a predetermined one of said instruction words to obtain a first address element, acessing a predetermined one of said base registers to obtain a second address element, and combining said first address element with said second address element to form a segment relative address;

b. storing at least one segment table containing a plurality of segment descriptors having a predetermined format, each of said segment descriptors describing one of said plurality of segments, each segment descriptor being accessible only by any number of particular predetermined ones of said plurality of processes to control access rights to said segment, said one segment being associated with a predetermined one of said segment descriptors, and each of said segment descriptors containing a base address of its associated segment; and c. combining said base address with said segment relative address (SRA) to form the absolute address of said final operand.

25. The method as recited in claim 24 including the step of indexing on the absolute address location by incrementing the absolute address location of said final operand to the addess next sequential used following the currently addressed word.

26. The method as recited in claim 24 including the step of indexing on the segment relative address (SRA) by incrementing the SRA of said final operand to the next SRA word following the current SRA word.

27. In an internally programmed data processing apparatus having a plurality of base registers, said apparatus being responsive to internally stored instruction words and having stored wthin said data processing apparatus a plurality of different types of groups of informational data, each data group type associated with an address spaced bounded by a predetermined segment of a plurality of segments having predetermined bounds, the method of developing, by n indirections to one of said plurality of base registers, an absolute address of a final operand contained within one of said segments, said method comprising the steps of:

a. accessing a predetermined one of said instruction words to obtain a first address element, accessing a predetermined one of said base registers to obtain a second address element, and combining said first address element with said second address element to form a first segment relative address;

b. storing at least one segment table containing a plurality of segment descriptors having a predetermined format, each of said segment descriptors describing one of said plurality of segments, each segment descriptor being accessible only by any number of particular predetermined ones of said plurality of processes to control access rights to said segment, said one segment being associated with a predetermined one of said segment descriptors, and each of said segment descriptors containing a base address of its associated segment;

c. accessing a predetermined one of said segment descriptors to obtain a first base address, and combining said first base address with said first segment relative address (SRA) to form the absolute address of a data descriptor;

d. accessing said data descriptor to obtain a third address element, accessing a predetermined second of said base registers to obtain a third address element, and combining said third address element with said fourth address element to form a second segment relative address (SRA); and e. accessing a predetermined second of said segment descriptors to obtain a second base address, and combining said second base address with said second segment relative address (SRA) to form a second absolute address of the final operand.

28. The method as recited in claim 27 including the step of indexing on the second absolute address location by incrementing the second absolute address location of said final operand to the address of the next sequential word following the currently addressed word.

29. The method as recited in claim 28 including the step of indexing on the second segment relative address (SRA) by incrementing the second SRA of said final operand to the next SRA following the current SRA word.

* * * * *

UNITED STATES PATENT AND TRADEMARK OFFICE
CERTIFICATE OF CORRECTION

PATENT NO. : 4,385,352

DATED : May 24, 1983

INVENTOR(S) : Jacques M. J. Bienvenu

It is certified that error appears in the above-identified patent and that said Letters Patent is hereby corrected as shown below:

In claim 7, line 7, "beam" should be —base—;
In claim 11, line 60, "address" is misspelled;
In claim 13, line 27, "relative" is misspelled;
In claim 13, line 30, "said" is misspelled;
In claim 21, line 64, "therein" is misspelled;
In claim 21, line 65, "group" is misspelled;
In claim 21, line 65, "informational" is misspelled;
In claim 24, line 38, "response" should be —responsive—;
In claim 24, line 40, "type" should be —types—;
In claim 25, line 2, after "sequential" the term —word— should be inserted;
In claim 27, line 14, "spaced" should be —space—; and
In claim 29, line 27, "claim 28" should be —claim 27—.

Signed and Sealed this

Ninth Day of August 1983

[SEAL]

Attest:

GERALD J. MOSSINGHOFF

Attesting Officer

Commissioner of Patents and Trademarks